(12) United States Patent
Rapp et al.

(10) Patent No.: US 12,492,140 B2
(45) Date of Patent: Dec. 9, 2025

(54) FABRICATION AND THERMAL SHAPING OF TRANSPARENT GLASS

(71) Applicant: GLASSOMER GMBH, Freiburg (DE)

(72) Inventors: Bastian Rapp, Freiburg (DE); Frederik Kotz-Helmer, March (DE)

(73) Assignee: GLASSOMER GMBH, Freiburg (DE)

( * ) Notice: Subject to any disclaimer, the term of this patent is extended or adjusted under 35 U.S.C. 154(b) by 107 days.

(21) Appl. No.: 18/006,705

(22) PCT Filed: Sep. 10, 2021

(86) PCT No.: PCT/EP2021/074968
§ 371 (c)(1),
(2) Date: Jan. 24, 2023

(87) PCT Pub. No.: WO2022/053632
PCT Pub. Date: Mar. 17, 2022

(65) Prior Publication Data
US 2023/0303420 A1 Sep. 28, 2023

(30) Foreign Application Priority Data

Sep. 14, 2020 (EP) .................................. 20195971

(51) Int. Cl.
*C03B 19/06* (2006.01)
*C08K 3/06* (2006.01)
(Continued)

(52) U.S. Cl.
CPC ........ *C03B 19/066* (2013.01); *C03B 2201/06* (2013.01)

(58) Field of Classification Search
CPC .............................. C03B 19/06; C03B 19/066
See application file for complete search history.

(56) References Cited

U.S. PATENT DOCUMENTS

| 3,732,181 A | 5/1973 | Sherliker |
| 5,085,938 A | 2/1992 | Watkins |
| (Continued) | | |

FOREIGN PATENT DOCUMENTS

| CN | 101528619 A | 9/2009 |
| CN | 108516818 A | 9/2018 |
| (Continued) | | |

OTHER PUBLICATIONS

Dillon et al., "Mechanism of "Solid-State" Single-Crystal Conversion in Alumina", J. Am. Ceram. Soc., 2007, vol. 90, No. 3, pp. 993-995.
(Continued)

*Primary Examiner* — Yunju Kim
(74) *Attorney, Agent, or Firm* — McDonnell Boehnen Hulbert & Berghoff LLP (57) ABSTRACT

A method of manufacturing a transparent glass article is provided. The manufacturing method includes the following steps (a) to (f): in step (a), a nanocomposite is provided; in step (b), the nanocomposite is subjected to an external stimulus in order to render it remoldable; in step (c), the nanocomposite is remolded into a predetermined shape in order to obtain a primary structure; in step (d), the primary structure is debound in order to obtain a secondary structure having cavities formed therein; in step (e) which is optional, the cavities of the secondary structure are filled with at least one additive; and in step (f), the secondary structure is sintered to obtain the transparent glass article.

13 Claims, 4 Drawing Sheets

(51) Int. Cl.
*C08K 3/40* (2006.01)
*C08L 29/14* (2006.01)
*C08L 71/02* (2006.01)
*C08L 101/00* (2006.01)

(56) References Cited

U.S. PATENT DOCUMENTS

| | | | |
|---|---|---|---|
| 5,549,746 | A | 8/1996 | Scott et al. |
| 6,357,868 | B1 * | 3/2002 | Pfaff .................... C04B 41/009 347/100 |
| 7,927,538 | B2 | 4/2011 | Moszner et al. |
| 10,940,639 | B1 | 3/2021 | Okpowe et al. |
| 10,954,155 | B2 | 3/2021 | Rapp et al. |
| 2007/0154666 | A1 | 7/2007 | Coonan et al. |
| 2009/0321971 | A1 | 12/2009 | Brodkin et al. |
| 2014/0197583 | A1 * | 7/2014 | Schubert ............... C04B 35/634 264/645 |
| 2016/0002117 | A1 | 1/2016 | Badding et al. |
| 2020/0024465 | A1 * | 1/2020 | Dylla-Spears ......... B33Y 70/10 |
| 2020/0039868 | A1 * | 2/2020 | Rapp ..................... C03B 19/066 |
| 2023/0303420 | A1 | 9/2023 | Rapp et al. |

FOREIGN PATENT DOCUMENTS

| | | | |
|---|---|---|---|
| CN | 109650853 | A | 4/2019 |
| CN | 109996767 | A | 7/2019 |
| CN | 111454067 | A | 7/2020 |
| CN | 111499371 | A | 8/2020 |
| CN | 112299828 | A | 2/2021 |
| DE | 102016012003 | A1 * | 4/2018 ........... B29C 64/165 |
| EP | 3081541 | A1 | 10/2016 |
| JP | H04349130 | A | 12/1992 |
| JP | 2007331962 | A | 12/2007 |
| KR | 2017-0058048 | A | 5/2017 |
| WO | 0048775 | A2 | 8/2000 |
| WO | 200048775 | A2 | 8/2000 |
| WO | 2018065093 | A1 | 4/2018 |
| WO | 2020-120458 | A1 | 6/2020 |
| WO | 2020-200424 | A1 | 10/2020 |
| WO | 2022/200627 | A1 | 9/2022 |
| WO | 2022200628 | A1 | 9/2022 |
| WO | 2022200629 | A1 | 9/2022 |

OTHER PUBLICATIONS

Gilde et al., "Evaluation of Hot Pressing and Hot Isostastic Pressing Parameters on the Optical Properties of Spinel", J. Am. Ceram. Soc., 2005, vol. 88, No. 10, pp. 2747-2751.
Liu et al., "Fabrication of Translucent Alumina Ceramics from Pre-Sintered Bodies Infiltrated with Sintering Additive Precursor Solutions", Journal of the European Ceramic Society, 2012, vol. 32(4), pp. 711-715.
Wang et al., "3D Printing of Transparent Spinal Ceramics with Transmittance Approaching the Theoretical Limit", Adv. Mater., 2021, vol. 33, pp. 1-9.
Krell, A. et al., "Transparent Sintered Corundum with High Hardness and Strength," Journal of the American Ceramic Society, vol. 86(1), pp. 12-18 (2003).
Scott, C. et al., "Conversion of Polycrystalline Al2O3 into Single-Crystal Sapphire by Abnormal Grain Growth," Journal of the American Ceramic Society, vol. 85(5), pp. 1275-1280 (2002).
Richter et al., "Fast and Cheap Fabrication of Molding Tools for Polymer Replication", Proc. SPIE, Microfluidics, BioMEMS, and Medical Microsystems XV, 2017, vol. 10061, pp. 1-6.
Schilardi et al., "Microtransfer Molding Using Metallic Stamps", The Journal of the Argentine Chemical Society, 2003, vol. 91, No. 1, pp. 143-152.
Kotz et al., "High-Throughput Thermal Replication of Transparent Fused Silica Glass", Proc. SPIE, Microfluidics, BioMEMS, and Medical Microsystems XVII, 2019, vol. 10875, pp. 1-6.
Minehan W.T. et al., "Titania-Silica Glasses Prepared by Sintering Alkoxide Derived Spherical Colloids," Journal of Non-Crystalline Solids, vol. 108, pp. 163-168 (1989).
Chu et al., "Silica Optical Fiber Drawn from 3D Printed Preforms", Optics Letters, 2019, vol. 44, No. 21, pp. 5358-5361.
Kotz et al., "Glassomer—Processing Fused Silica Glass Like a Polymer," Advanced Materials, 2018, vol. 30, 1707100, pp. 1-5.
International Search Report and Written Opinion dated Dec. 7, 2021 for International Patent Application No. PCT/EP2021/074968.
Extended European Search Report dated Mar. 1, 2021 for European Patent Application No. 20195971.5.
"Adomatex, Admafine," [online], Apr. 19, 2016, three pages. retrieved on May 30, 2025, from <http://web.archive.org/web/20160419235648/http://www.admatechs.co.jp/product-admafine.html>.

* cited by examiner

FABRICATION AND THERMAL SHAPING OF TRANSPARENT GLASS

CROSS-REFERENCE

This application is a 371 U.S. national phase of PCT/EP2021/074968, filed Sep. 10, 2021, which claims priority from EP 20195971.5, filed Sep. 14, 2020, both which are incorporated by reference in its entirety.

FIELD OF THE INVENTION

The present invention relates to a method of manufacturing a transparent glass article and to a transparent glass article obtainable by said method.

BACKGROUND OF THE INVENTION

Transparent glass is an important material due to its optical transparency combined with its high thermal, chemical and mechanical stability. Shaping of transparent glass into glass articles is, however, intricate due to the high melting point of transparent glass, which is particularly high in case the transparent glass is made of fused silica. Today, transparent glass is mostly shaped into glass articles using melt processing, grinding or etching. However, none of these processes allows high-throughput replication of the transparent glass article to be obtained.

Recently, there have been proposed concepts based on nanocomposites comprising a binder matrix and glass particles dispersed therein, which allow shaping of transparent glass using additive manufacturing, 3D printing and similar technologies by selectively applying heat or irradiation. However, the above processes are only suitable for rapid prototyping and are limited to very small scale series in the manufacturing of glass articles. In other words, such processes do not scale well industrially.

In this context, US 2007/0154666 A1 describes a method for producing glass or glass ceramic articles by powder injection molding of glass powder. Specifically, the method comprises mixing together, in a continuous mixing process, an organic binder, a glass powder and a wax to obtain a mixture; forming the mixture so as to form of the mixture a first formed structure; and debinding and sintering the first formed structure. However, based on the size of the glass powder used as well as the relatively low density, it must be concluded that the glass or glass ceramic articles obtained in US 2007/0154666 A1 are not transparent.

WO 00/48775 A2 describes a silicate glass honeycomb article, comprising up to about 9% titanium dioxide, wherein said article is prepared by an extrusion process utilizing high purity fused silica soot particles, which are dispersed in a rubbery paste formulation comprising Elvanol® or Methocel®. That is, the silica soot particles are dispersed in an aqueous suspension with a thickening agent, which requires extensive drying after the article has been extruded.

EP 3 081 541 A1 discloses a method for producing ultrathin glass sheets in which a polymer/glass compound comprising from 30 to 80 vol % of a mineral component consisting of glass particles and optionally ceramic particles, and from 20 to 70 vol % of an organic component consisting of one or more thermoplastic polymers and one or more processing aids selected from the group consisting of surfactants, waxes, and plasticizers is extruded as a composite polymer/glass sheet, and thereafter progressively heated to a temperature of between 500° C. and 1600° C., so as to first burn out the organic component and then sinter together the glass particles of the mineral component, thereby obtaining a glass sheet. However, as demonstrated by the Examples of EP 3 081 541 A1, this method is restricted to manufacture ultrathin glass sheets having a thickness of about 200 µm.

JP H04 349130 A discloses a method for producing a quartz glass molding in which silica having a specific particle size is blended with a binder formulation comprising a thermoplast such as an EVA copolymer (poly(ethylene-vinyl acetate)) or polypropylene, an acrylic resin, plasticizers, and lubricants. Said blended mixture is injection molded and, after debinding, sintered at a temperature of 1000 to 1800° C. However, the resulting glass molding is deemed to be translucent or opaque, but not transparent.

Further, WO 2018/065093 A1 describes a composition and a method for producing a molded body from highly pure, transparent quartz glass by means of additive manufacturing. Specifically, the composition comprises an organic binder which is present in liquid form at room temperature, and which can be polymerized/crosslinked upon exposure to heat or irradiation; a polymerization initiator/crosslinking agent which initiates the polymerization/crosslinking of the organic binder via supply of heat or irradiation; and at least one type of spherical quartz glass particles which are dispersed in the organic binder. In WO 2018/065093 A1, however, it is required that the organic binder is liquid at room temperature so that the composition can be processed with high spatial resolution by selectively applying heat or irradiation. This makes the organic binder unsuitable for replication processes such as injection molding, for instance. Besides, the organic binder is required to be polymerizable/crosslinkable in order to achieve sufficient mechanical stability during formation of the green body. Otherwise, the green body would be too soft to sustain the load during processing. Again, this makes the organic binder disclosed in WO 2018/065093 A1, which needs to be liquid at room temperature, unsuitable for replication processes. A similar process is described by F. Kotz et al., Adv. Mater. 2018, 30, 1707100. Here, amorphous silica nanopowders with a diameter of 100 nm were dispersed in a monomeric mixture containing hydroxyethyl methacrylate (HEMA) and phenoxyethanol (POE).

SUMMARY OF THE INVENTION

In view of the above, it is an object of the present invention to overcome the above drawbacks associated with the shaping of transparent glass known in the art. In particular, the technical problem underlying the present invention is to provide a method of manufacturing a transparent glass article, which should allow shaping transparent glass into glass articles with the ease of replication processes that are extendible to an industrial scale.

The above technical problem underlying the present invention has been solved by providing the embodiments characterized in the claims.

The present invention relates to a method of manufacturing a transparent glass article, the manufacturing method comprising the following steps (a) to (f): in step (a), a nanocomposite is provided; in step (b), the nanocomposite is subjected to an external stimulus in order to render it remoldable; in step (c), the nanocomposite is remolded into a predetermined shape in order to obtain a primary structure; in step (d), the primary structure is debound in order to obtain a secondary structure having cavities formed therein; in step (e) which is optional, the cavities of the secondary structure are filled with at least one additive; and in step (f), the secondary structure is sintered to obtain the transparent glass article.

DETAILED DESCRIPTION OF THE INVENTION

In particular, in one aspect, the present invention provides a method of manufacturing a transparent glass article, the manufacturing method comprising and preferably consists of the following steps (a) to (f):
(a) providing a nanocomposite comprising an organic thermoplastic binder matrix and glass particles dispersed therein, the organic thermoplastic binder matrix being solid at room temperature;
(b) subjecting the nanocomposite to an external stimulus, thereby rendering the nanocomposite remoldable;
(c) remolding the nanocomposite into a predetermined shape, thereby obtaining a primary structure;
(d) debinding the primary structure by removing the organic thermoplastic binder matrix, thereby obtaining a secondary structure, the secondary structure having cavities formed therein;
(e) optionally filling the cavities of the secondary structure with at least one additive; and
(f) sintering the secondary structure, thereby obtaining the transparent glass article, wherein the glass particles comprise spherical glass particles having a diameter in the range from 5 nm to 400 nm.

Advantageously, the manufacturing method according to the present invention which is characterized by the above-defined process steps allows shaping transparent glass into glass articles with the ease of replication processes that are extendible to an industrial scale, such as injection molding, for instance. As a result, the manufacturing method according to the present invention allows high-throughput replication of the transparent glass article to be obtained, which is not possible with the processes established in the art as discussed above. Advantageously, as the moldable nanocomposite can be shaped into the predetermined geometric form by any suitable means known in the art, as described in more detail below, the predetermined geometric form is not further limited. Hence, the geometric form of the transparent article which is eventually obtained by debinding and sintering is not further limited, either. According to the present invention, the transparent glass article to be produced is understood as an article having any arbitrary form. Preferably, the thickness of the same is 0.5 mm (500 µm) or more, more preferably 0.6 mm (600 µm) or more, even more preferably 0.8 mm (800 µm) or more, and most preferably 1.0 mm (1000 µm) or more.

In the following, steps (a) to (f) of the manufacturing method according to the present invention are described in detail by reference to FIG. 1 which shows these steps (a) to (f) in a schematic manner.

In step (a) of the method of manufacturing a transparent glass article as defined above, a nanocomposite is provided. The nanocomposite provided in step (a) comprises an organic thermoplastic binder matrix and glass particles dispersed therein (the latter are shown as white points in FIG. 1, steps (a) to (e)). The organic thermoplastic binder matrix is solid at room temperature. Herein, room temperature is to be understood as a temperature of 25° C.

According to the present invention, the organic thermoplastic binder matrix is solid at room temperature. At elevated temperature, when subjected to an external stimulus such as heat or irradiation, preferably heat, the organic thermoplastic binder matrix can be softened, e.g. it can be partially or entirely molten. When the organic thermoplastic binder matrix is no longer subjected to the external stimulus, it becomes solid again. Being organic, the organic thermoplastic binder matrix used in the present invention is derived from monomers having a hydrocarbon backbone. These monomers are reacted with each other to yield e.g. polyolefins by polymerization, to yield e.g. polyesters or polyamides by polycondensation, or to yield e.g. polyurethanes by polyaddition. Being thermoplastic, the organic thermoplastic binder matrix used in the present invention is neither polymerizable nor crosslinkable. That is, when subjected to the external stimulus, the organic thermoplastic binder matrix only softens but does not undergo any chemical reaction. In the state where the organic thermoplastic binder matrix is softened, the nanocomposite can be remolded into a predetermined shape. In fact, it is this remoldability which is inherent to the nanocomposite comprising the organic thermoplastic binder matrix provided in step (a). Herein, the nanocomposite may be provided in any suitable form, e.g. in form of granules, also referred to as granular form, without, however, being limited thereto.

According to the present invention, the composition of the organic thermoplastic binder matrix is not further limited. For example, the organic thermoplastic binder matrix may be composed of polyesters based on aromatic or aliphatic dicarboxylic acids and diols and/or hydroxycarboxylic acids, polycarbonates based on aliphatic or aromatic diols, polyolefins such as polyethylene, polypropylene, polybutene, polymethylpentene, polyisobutene, ethylene propylene rubber (EPR), and poly(vinyl butyral), cycloolefin polymers, as well as polyamides, polyethers including aromatic polyethers based on bisphenols, or polyurethanes, or a combination thereof, without, however, being limited thereto. Specifically, the organic thermoplastic binder matrix may be composed of poly(vinyl butyral).

In order to impart sufficient mechanical stability to the primary structure obtained in step (c) as described further below, the average molecular weight of the polymers constituting the organic thermoplastic binder matrix should be sufficiently high, meaning at least several hundreds of grams per mol. At least, the average molecular weight of the polymers constituting the organic thermoplastic binder matrix is such that the latter is solid at room temperature but can be softened at elevated temperature, when subjected to the external stimulus. However, in case the average molecular weight of the polymers constituting the organic thermoplastic binder matrix is too high, the latter may decompose at elevated temperature without softening, e.g. without partially or entirely melting. Typically, the organic thermoplastic binder matrix has a melting temperature in the range from 50° C. to 200° C., preferably in the range from 100° C. to 150° C. Herein, the melting temperature of the organic thermoplastic binder matrix is determined in accordance with DIN 51006 or DIN 51007, depending on the crystallinity of the polymers constituting the organic thermoplastic binder matrix.

Apart from the organic thermoplastic binder matrix, the nanocomposite provided in step (a) comprises glass particles as an essential component. The glass particles are dispersed in the organic thermoplastic binder matrix. Dispersion of the glass particles can be achieved by any means known in the art. For example, in order to disperse the glass particles, the organic thermoplastic binder matrix may be softened or the polymers constituting the organic thermoplastic binder matrix may be dissolved in a suitable organic solvent before adding the glass particles thereto.

In a preferred embodiment of the present invention, the glass particles are fused silica glass particles. Fused silica glass is characterized in that it consists of high-purity amorphous silicon dioxide. That is, fused silica glass does not substantially contain any ingredients which are typically added to other sorts of glass with the intention to lower the melting point thereof. As such, fused silica glass exhibits high thermal stability, which makes it in turn difficult to process by conventional processes such as melt processing. This drawback is overcome by the manufacturing method according to the present invention which does not require any melt processing. Since fused silica glass exhibits a high optical transmission at a wavelength in the range from 340 nm to 400 nm, it is widely applied in the field of optics, e.g. as a substrate for lenses. Herein, fused silica glass is to be understood as glass with a mass fraction of silicon dioxide being at least 99% based on the total mass of the glass, with typical impurities such as Al, Ca, Cu, Fe, Na, K, Li and Mg amounting to less than 15 ppm, respectively.

As an alternative to fused silica glass particles or in addition thereto, any other kind of glass particles may be used in the present invention without limitation.

In the present invention, the glass particles comprise spherical glass particles having a diameter in the range from 5 nm to 400 nm, preferably in the range from 7 nm to 400 nm, more preferably in the range from 10 nm to 200 nm, and even more preferably in the range from 50 nm to 100 nm. These glass particles are also referred to herein as the first type of glass particles. It is the first type of glass particles having a diameter in the nanometer range which makes the composite comprising the organic thermoplastic binder matrix and the glass particles dispersed therein a nanocomposite.

In the present invention, the glass particles may further comprise spherical glass particles having a diameter in the range from 2 μm to 50 μm, preferably in the range from 2 μm to 40 μm. These glass particles are also referred to herein as the second type of glass particles. In case the glass particles comprise the first type of glass particles and the second type of glass particles, i.e. comprise a bimodal mixture of glass particles, the glass particles having the smaller diameter can fill the interstices between the glass particles having the larger diameter. Thereby, a denser packing of the glass particles is achieved, which in turn leads to a smaller shrinkage during sintering in step (f) as described further below. In principal, the glass particles may further comprise any other type of glass particles with a diameter different from that of the first type of glass particles and different from that of the second type of glass particles. Such multimodal mixtures of glass particles are also within the scope of the present invention.

Herein, the diameter of the first, second and any other type of glass particles is to be understood as the mean average diameter which is measured in accordance with ISO 9276-2. In addition, the term "spherical" is to be understood as also encompassing spheroidal glass particles, i.e. glass particles which have a sphere-like geometry. For instance, as regards the first type of glass particles with a diameter in the range from nm to 400 nm, this means that these glass particles may substantially have no dimension in which the diameter is smaller than 5 nm and substantially no dimension in which the diameter is larger than 400 nm.

Without being limited thereto, the content of the glass particles in the nanocomposite is at least 5 parts per volume, preferably at least 30 parts per volume, and more preferably at least 50 parts per volume based on 100 parts per volume of the organic thermoplastic binder matrix. The higher the content of the glass particles in the nanocomposite, the denser the packing of the glass particles in the transparent glass article to be obtained. As surprisingly found by the present inventors, even if the content of the glass particles in the nanocomposite with respect to the organic thermoplastic binder matrix is rather high, e.g. 55 parts per volume or more based on 100 parts per volume of the organic thermoplastic binder matrix, it is still possible to remold the nanocomposite in step (b) as described further below. The upper limit of the content of the glass particles in the nanocomposite is not specifically restricted and is preferably 75 parts per volume or less, more preferably 70 parts per volume or less, and most preferably 60 parts per volume or less based on 100 parts per volume of the organic thermoplastic binder matrix. Thus, the content of the glass particles in the nanocomposite is preferably to 75 parts per volume, more preferably 50 to 70 parts per volume, and most preferably 55 to 60 parts per volume based on 100 parts per volume of the organic thermoplastic binder matrix.

Apart from the organic thermoplastic binder matrix and the glass particles dispersed therein, the nanocomposite may comprise one or more additional agents as required, which facilitate the manufacturing of the transparent glass article to be obtained.

For example, in order to facilitate dispersion of the glass particles in the organic thermoplastic binder matrix, a dispersion agent may be added. As the dispersion agent, nonionic surfactants, e.g. polyoxyethylene alkyl ether or polyoxymethylene, and anionic surfactants, e.g. fatty acids and their salts or aliphatic carboxylic acids and their salts, such as stearic acid and its salts or oleic acid and its salts, may be mentioned without limitation. However, it is preferred that the nanocomposite does not comprise such a dispersion agent nor any solvent.

In order to facilitate debinding of the primary structure in step (d) as described further below, according to a preferred embodiment of the present invention, the nanocomposite further comprises a phase-forming agent dispersed in the organic thermoplastic binder matrix. The phase-forming agent which is solid or viscous at room temperature forms an internal phase in the organic thermoplastic binder matrix. Examples of the phase-forming agent include alcohols, ethers and silicone oils as well as combinations thereof, with these substances having a sufficiently high molecular weight and/or having appropriate functionalizations so as to be solid or viscous at room temperature. Herein, the term "viscous" is to be understood as referring to a viscosity of at least 5 mPa·s at room temperature, as measured in accordance with DIN 53019. The phase-forming agent can be removed from the organic thermoplastic binder matrix before or during debinding of the primary structure in step (d) as described further below, e.g. by means of thermal treatment which leads to the evaporation or sublimation of the phase-forming agent, or which leads to its decomposition. Further, the phase-forming agent may be removed by means of solvent extraction.

As a specific example, phenoxyethanol may be mentioned as the phase-forming agent. Phenoxyethanol has a viscosity of about 30 mPa-s at room temperature, thus being a viscous substance. It can be evaporated at a temperature of 242° C. under atmospheric pressure. However, significant quantities thereof are already removed at lower temperatures due to its high vapor pressure. A preferred example of the phase-forming agent include polyethylene glycol (PEG). Thus, in a preferred embodiment of the present invention, the nanocomposite consists of the organic thermoplastic binder matrix such as poly(vinyl butyral), the glass particles, and the phase-forming agent such as poly(ethylene glycol), the latter both constituents being dispersed therein, wherein the at least one phase-forming agent is solid or viscous at room temperature.

The molecular weight (polymer chain length) of the polyethylene glycol (PEG) used as phase forming agent is not particularly limited as long as it is solid or viscous at room temperature. Preferred examples of PEG are low-molecular-weight PEGs, such as PEG 300 to PEG 20000, preferably PEG 400 to PEG 10000, which are commercially available products.

Figure 1:
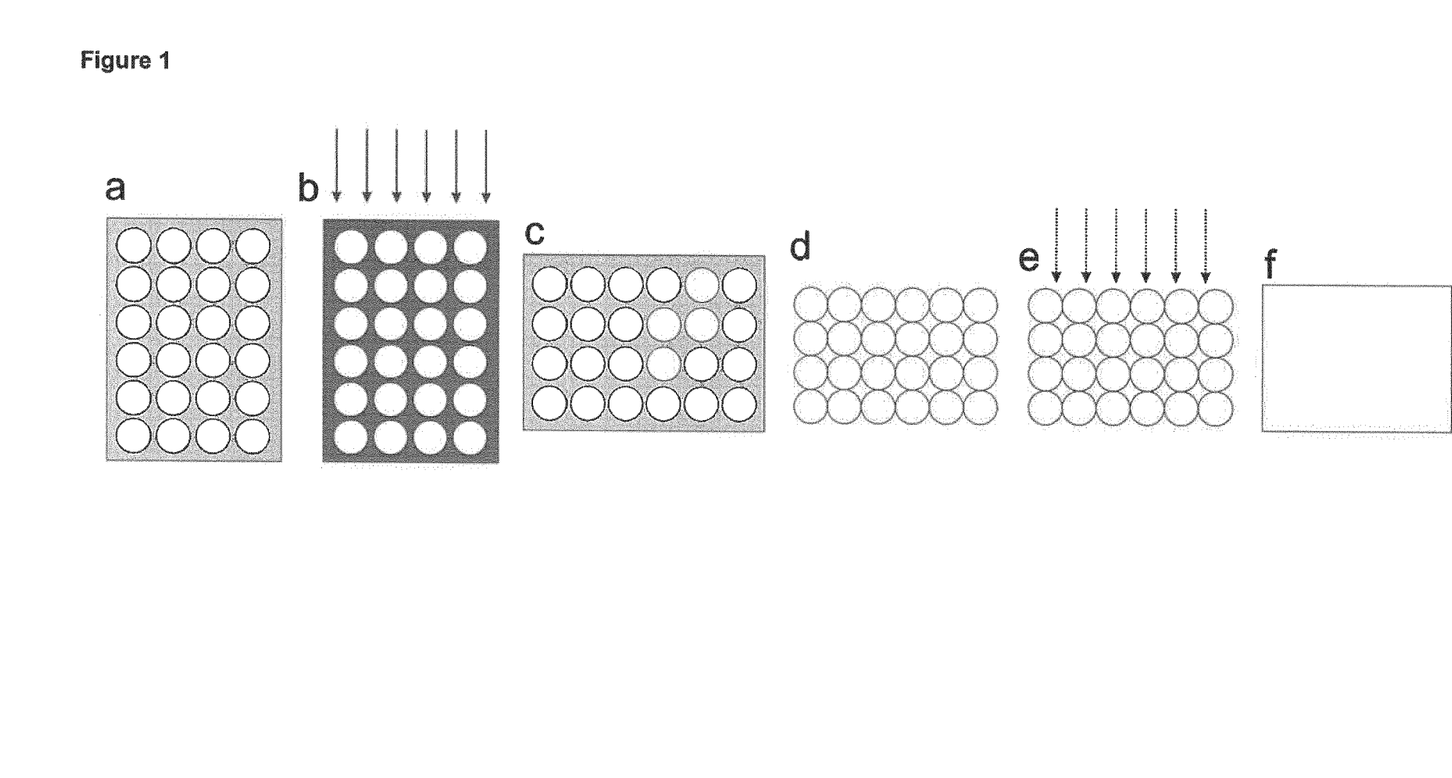
FIG. 1 shows steps (a) to (f) of the method of manufacturing a transparent glass article according to the present invention in a schematic manner: in step (a), a nanocomposite is provided; in step (b), the nanocomposite is subjected to an external stimulus in order to render it remoldable; in step (c), the nanocomposite is remolded into a predetermined shape in order to obtain a primary structure; in step (d), the primary structure is debound in order to obtain a secondary structure having cavities formed therein; in step (e) which is optional, the cavities of the secondary structure are filled with at least one additive; and in step (f), the secondary structure is sintered to obtain the transparent glass article.

In step (b) of the method of manufacturing a transparent glass article as defined above, the nanocomposite is subjected to an external stimulus (illustrated by the arrows in FIG. 1, step (b)). Thereby, the nanocomposite is rendered remoldable. Since the nanocomposite provided in step (a) of the method of manufacturing a transparent glass article as defined above does not include any solvent etc., but only the solid-state organic thermoplastic binder matrix along with the glass particles and optionally the phase-forming agent, according to the present invention, it is not necessary to carry out any drying process in order to remove any solvent such as water.

According to the present invention, the external stimulus is not further limited as long as it can render the nanocomposite remoldable. In order to do so, the external stimulus needs to invoke the organic thermoplastic binder matrix to become softened, e.g. partially or entirely molten, so that the nanocomposite comprising the organic thermoplastic binder matrix and the glass particles dispersed therein can be shaped in a predetermined manner as desired. Typically, as the external stimulus, heat or irradiation, preferably heat, is applied. Suitable means for subjecting the nanocomposite to the external stimulus are known to the skilled person and are routinely applied depending on the organic thermoplastic binder matrix. Once the nanocomposite is rendered remoldable, the external stimulus may still be applied to such extent that the organic thermoplastic binder matrix remains softened and does not instantaneously become solid again. When using a replication process with a mold in step (c) as described further below, the external stimulus may act on the nanocomposite via the mold. That is, the mold transfers the energy provided by the external stimulus to the organic thermoplastic binder matrix in the nanocomposite.

As mentioned above, the external stimulus is not further limited as long as it can render the nanocomposite remoldable. In order to do so, the external stimulus needs to be capable of softening the organic thermoplastic binder matrix. For example, in case the external stimulus is heat, a heat source with an appropriate temperature and with an energy density sufficient to soften the organic thermoplastic binder matrix may be used. Further, in case the external stimulus is irradiation, an irradiation source with an appropriate wavelength and with an energy density sufficient to soften the organic thermoplastic binder matrix may be used. As a matter of course, the conditions to be applied for rendering the nanocomposite remoldable depend on the organic thermoplastic binder matrix used. Typically, the temperature which is required for rendering the nanocomposite remoldable is less than 400° C., preferably less than 200° C., and particularly preferably less than 150° C. As the organic thermoplastic binder matrix needs to be solid at room temperature, the temperature which is required for rendering the nanocomposite remoldable is more than 25° C., typically more than 40° C.

In step (c) of the method of manufacturing a transparent glass article as defined above, the nanocomposite is remolded into a predetermined shape. Thereby, a primary structure, also referred to as green body, is obtained. The predetermined shape into which the nanocomposite is remolded in step (c) already reflects the shape of the transparent glass article to be obtained.

According to the present invention, remolding the nanocomposite in step (c) is not further limited as long as it can yield the predetermined shape. Preferably, the nanocomposite is remolded into a predetermined shape in step (c) by means of injection molding, extrusion or blow molding, each of which may be seen as a replication process. Other replication processes which may be exemplarily mentioned for remolding the nanocomposite in step (c) are hot embossing, thermoforming, calendering, hot and cold pressing or injection compression molding. Since these replication processes may be carried out at comparatively low temperatures as they only require the organic thermoplastic binder matrix to be softened but not the glass particles, the present invention allows high-throughput replication of the transparent glass article to be obtained. Thereby, the manufacturing of the transparent glass article can be easily extended to an industrial scale. According to the present invention, the term "remolded" does not imply the presence of a mold in step (c) for obtaining the primary structure having a predetermined shape. Herein, it is also contemplated that the nanocomposite may be remolded into a predetermined shape in step (c) by means of extrusion-based additive manufacturing, e.g. by means of fused deposition modeling, without, however, being limited thereto.

As required, the primary structure obtained in step (c) may be subjected to a post-processing. For example, in case the primary structure has visible artefacts resulting from the replication process and the mold used therein, such post-processing may be readily applied. Suitable means for post-processing are known to the skilled person, including drilling, sawing, milling, lathing, grinding and polishing, without, however, being limited thereto. In principal, it is possible to apply any type of additive or subtractive post-processing.

In step (d) of the method of manufacturing a transparent glass article as defined above, the primary structure is debound by removing the organic thermoplastic binder matrix. Thereby, a secondary structure, also referred to as brown body, is obtained. As a result of debinding, i.e. removing the organic thermoplastic binder matrix, the secondary structure has cavities formed therein.

Depending on the organic thermoplastic binder matrix, the primary structure may be debound in step (d) by means of thermal treatment, chemical reaction, reduced pressure, solvent extraction, or a combination thereof. For example, the primary structure may be first immersed in a solvent for carrying out solvent extraction before being thermally treated. In principal, any means may be applied which can remove the organic thermoplastic binder matrix without adversely affecting the glass particles constituting the secondary structure. In this context, a person skilled in the art routinely selects appropriate conditions to be applied for removing the organic thermoplastic binder matrix in step (d).

For example, in case debinding takes places by means of thermal treatment, the temperature applied is typically in the range from 150° C. to 600° C. The heating rate is typically in the range from 0.1° C./min to 2° C./min, for example in the range from 0.5° C./min to 1° C./min. The holding time is typically in the range from 2 minutes to 10 hours, depending on the size of the transparent glass article to be obtained. In case the size thereof is rather small, already a few seconds may be sufficient for debinding the primary structure in step (d). Thermal treatment may also be carried out in a stepwise manner. In accordance with the above considerations, debinding by means of thermal treatment can be further facilitated by means of reduced pressure, i.e. subatmospheric pressure, which renders the organic thermoplastic binder matrix more volatile.

After removal of the organic thermoplastic binder matrix, the glass particles adhere together due to hydrogen bonds. Thereby, mechanical stability is imparted to the secondary structure. Taking account of the size of the glass particles, the diameter of which lies in the nanometer range, the glass particles have a high specific surface area which allows for sufficient interaction to keep the secondary structure mechanically stable.

Before the organic thermoplastic binder matrix is removed in step (d), or during the removal of the organic thermoplastic binder matrix, the phase-forming agent if present is removed from the primary structure, e.g. by evaporation or sublimation, or by decomposition. Removal of the phase-forming agent if present can also be accomplished by means of solvent extraction. In principal, the same means may be applied as described above in connection with the removal of the organic thermoplastic binder matrix.

As a result of removing the phase-forming agent if present, debinding of the primary structure in step (d) is facilitated. The reason therefore is that the internal phase formed by the phase-forming agent in the organic thermoplastic binder matrix generates pores in the primary structure when it is removed. Through these pores, the organic thermoplastic binder matrix which remains can then be removed in a more controlled manner. Thereby, the secondary structure is more easily prevented from being damaged, in particular when it adopts a thick structure such as 1.0 mm or more.

In step (e) of the method of manufacturing a transparent glass article as defined above, the cavities of the secondary structure may be filled with at least one additive. According to the present invention, step (e) is optional. The at least one additive, also referred to as filler, necessarily has a suitable particle size so that it can be introduced into the cavities formed in the secondary structure. Herein, the at least one additive is not further limited and may be selected as appropriate.

For example, in order to impart a specific color to the transparent glass article to be obtained, the at least one additive may be selected from pigments, such as gold(III) chloride ($AuCl_3$) or chromium(III) nitrate ($Cr(NO_3)_3$), for instance. Since the secondary structure is exposed to rather high temperatures when sintered in step (f) as described further below, the pigments need to withstand these temperatures. Therefore, inorganic pigments like those mentioned above are preferred compared to organic pigments which may be prone to decomposition when heated to the rather high temperatures applied during sintering.

Generally, in order to impart specific optical characteristics to the transparent glass article to be obtained, the at least one additive may be selected from doping reagents, which, upon decomposition during sintering in step (f) as described further below, lead to a dopant, such as Ti, F, Na, K, Ca, Ce, Dy, Er, Eu, Gd, Ho, La, Lu, Nd, Pr, Pm, Sm, Sc, Tb, Tm, Yb, Y, Ge, Pb, Ba, Zr, Zn, Al and Mg, for instance. Suitable doping reagents are known to the skilled person.

Moreover, in order to increase the density of the transparent glass article to be obtained, the at least one additive may be selected from glass precursors, such as silicon-based precursors like tetraethyl orthosilicate ($Si(OC_2H_5)_4$), also referred to as TEOS, for instance. In particular, glass precursors may be used herein, forming glass which is not distinguishable from that of the glass particles in the nanocomposite. However, it is also possible to use glass precursors herein, forming glass which is different from that of the glass particles in the nanocomposite. For example, when the nanocomposite comprises fused silica glass particles as the glass particles, it is also possible to use a titanium-based precursor like tetraethyl orthotitanate ($Ti(OC_2H_5)_4$). Other metal alkoxides which may be used herein include titanium isopropoxide, titanium ethoxide, zirconium ethoxide, aluminium isopropoxide, vanadyl isopropoxide, niobium ethoxide, tantalum ethoxide, and potassium tert-butoxide. Further suitable glass precursors are known to the skilled person, which may be used herein as well.

In the course of sintering the secondary structure to obtain the transparent glass article in step (f) as described further below, the glass particles and optionally added additives are converted to dense glass. By filling the secondary structure with a glass precursor, shrinkage of the secondary structure during sintering can be reduced.

In case the glass particles in the nanocomposite are fused silica glass particles and the cavities of the secondary structure are filled with silicon-based precursors like TEOS, a transparent glass article made of highly pure fused silica glass having a density comparable to conventionally processed fused silica glass can be obtained. Even if the secondary structure is not filled with a glass precursor in step (e), the optical transmission at a wavelength in the range from 200 nm to 1000 nm and the Vickers hardness of the transparent glass article obtained after sintering are comparable to conventionally processed fused silica glass.

The cavities of the secondary structure may be filled with the at least one additive in step (e) by immersing the secondary structure in a solution containing the at least one additive, by exposing the secondary structure to physical or chemical vapor deposition in an atmosphere containing or generating the at least one additive, or by a combination thereof. However, in principle, any other filling process may be applied in this respect as well. For example, it is also possible to apply a sol-gel process.

As appropriate, the cavities of the secondary structure may be filled with the at least one additive even before debinding of the primary structure is completed. In this case, it is the partially debound primary structure which is filled with the at least one additive.

Depending on the at least one additive with which the cavities of the secondary structure are filled in step (e), the secondary structure may be first immersed in a solution containing the at least one additive, e.g. a pigment, and then exposed to physical or chemical vapor deposition containing or generating the at least one additive, e.g. a glass precursor.

In step (f) of the method of manufacturing a transparent glass article as defined above, the secondary structure is sintered. Thereby, the transparent glass article is obtained.

Suitable sintering conditions are known to the skilled person and are routinely selected as appropriate. For example, the temperature applied is typically in the range from 700° C. to 1500° C. The heating rate is typically in the range from 1° C./min to 10° C./min, for example 5° C./min. The holding time is typically in the range from 0.5 hours to 4 hours, depending on the size of the transparent glass article to be obtained. In case the cavities of the secondary structure are filled with a doping reagent and/or with a glass precursor in step (e), the secondary structure may be pre-sintered at an intermediate temperature in order to decompose or convert it to glass. For example, pre-sintering may be carried out at a temperature in the range from 400° C. to 700° C.

Herein, sintering does not require the application of pressure. On the contrary, sintering in step (f) can be suitably carried out at a pressure below atmospheric pressure, e.g. at a pressure of at most 0.1 mbar, preferably at most 0.01 mbar, and particularly preferably at most 0.001 mbar. Since sintering can be carried out at atmospheric pressure or even below, there are no particular requirements to be complied with in the present invention regarding the sintering furnace.

After sintering, the obtained transparent glass article can be cooled to room temperature. In case the glass particles in the nanocomposite are fused silica glass particles, it is possible to select both a comparatively high heating rate as well as a comparatively high cooling rate, taking account of the low coefficient of thermal expansion and taking account of the high thermal shock resistance of fused silica glass.

The transparent glass article obtainable by the manufacturing method according to the present invention is characterized in that the optical transmission thereof is more than 70%, preferably more than 85%, and particularly preferably more than 90% at a wavelength in the range from 200 nm to 1000 nm for a layer thickness of 1.0 mm. Notably, according to the present invention, the transparent glass article obtainable by the manufacturing method according to the present invention is not restricted to ultrathin glass sheets. In preferred embodiments, the transparent glass article has a thickness of at least 0.5 mm, preferably at least 0.6 mm, more preferably at least 0.8 mm, most preferably at least 1.0 mm. In addition, the transparent glass article may have a thickness up to 500 mm and preferably up to 100 mm.

Further, the transparent glass article obtainable by the manufacturing method according to the present invention is characterized in that the Vickers hardness thereof is more than 700 HV as measured in accordance with DIN EN ISO 6507. Accordingly, the material properties of the transparent glass article obtainable by the manufacturing method according to the present invention satisfy the specifications which are to be met by fused silica glass in many applications.

The transparent glass article, which is obtainable by the method of manufacturing a transparent glass article according to the present invention, can be used for a variety of different applications. For example, it may be applied in the field of optics, e.g. as a substrate for lenses. Due to the specific process steps of the manufacturing method according to the present invention, the transparent glass article according to the present invention can be manufactured with the ease of replication processes that are extendible to an industrial scale.

Advantageously, based on the organic thermoplastic binder matrix used in the present invention, which is solid at room temperature, and which can disperse a high amount of glass particles, the present invention allows, for the first time, shaping transparent glass into glass articles by means of low-temperature replication processes, such as injection molding. Thereby, a high-throughput replication of the transparent glass article to be obtained can be achieved, which is not possible with the processes established in the art.

EXAMPLES

The present invention is further illustrated by the following Working Examples without, however, being limited thereto.

Working Example 1

Injection Molding of a Nanocomposite Comprising Fused Silica Glass Particles

Variant 1 (Premixing of fused silica glass particles with organic thermoplastic binder): 25 g fused silica glass particles with a mean average diameter of 50 nm to 100 nm were dispersed in a solution of 6 g poly(vinyl butyral) and 6 g poly(ethylene glycol) (PEG 1500) in 60 mL tetrahydrofuran using a laboratory dissolver. The mixture was then dried in an oven at 70° C. to obtain a nanocomposite comprising the organic thermoplastic binder matrix and the silica glass particles dispersed therein.

Variant 2 (Premixing of fused silica glass particles with organic thermoplastic binder): 25 g fused silica glass particles with a mean average diameter of 50 nm to 100 nm were dispersed in a solution of 6 g poly(ethylene glycol) (PEG 1500) in 60 mL water using a laboratory dissolver. The mixture was then dried in an oven at 70° C. After grinding the dried mixture, it was mixed with 6 g poly(vinyl butyral) using a double screw micro compounder to obtain a nanocomposite comprising the organic thermoplastic binder matrix and the silica glass particles dispersed therein.

Figure 2:
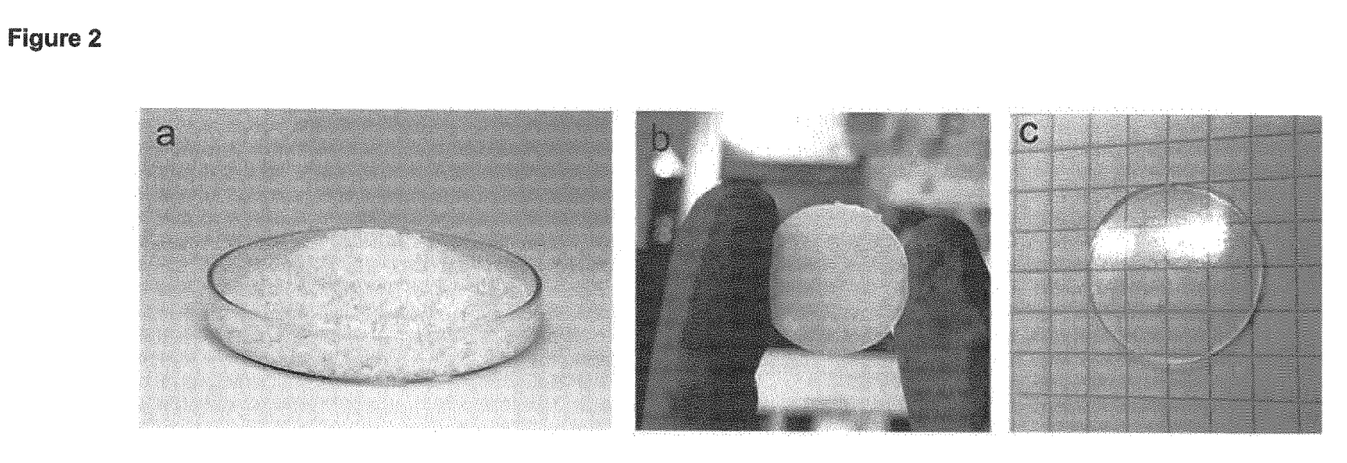
FIG. 2 shows photographs of (a) the nanocomposite, (b) the green body, and (c) the transparent glass article obtained in Working Example 1 described below.

The obtained nanocomposite of variant 2 which is shown in FIG. 2, step (a), was injection-molded using a microinjection molder (DSM X-Plore) at a temperature of 130° C. and with a pressure of 8 bar for 4 seconds. The holding pressure was 8 bar. The mold of the microinjection molder was set to a temperature of 55° C. to keep the nanocomposite remoldable. By injection molding the nanocomposite, a green body having a predetermined shape was obtained.

The obtained green body which is shown in FIG. 2, step (b), was then immersed in water at 40° C. for 4 hours to remove poly(ethylene glycol) used as the phase-forming agent by means of solvent extraction.

Figure 3:
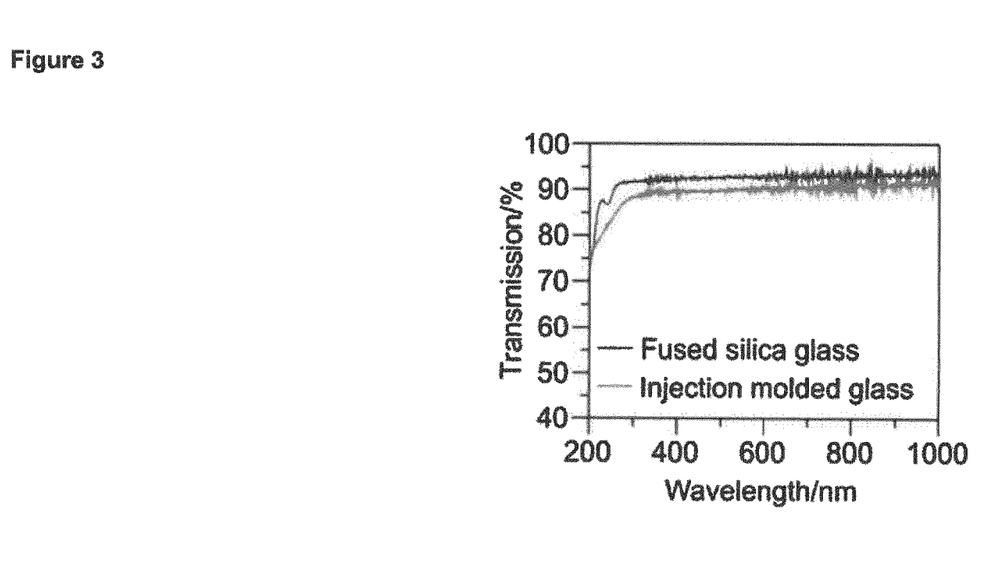
FIG. 3 shows the optical transmission spectrum of the transparent glass article obtained in Working Example 1 described below along with the optical transmission spectrum of a commercially available transparent glass article for the sake of comparison.

The organic thermoplastic binder matrix of the immersed green body was then removed by thermal debinding applying the following protocol, thereby obtaining a brown body:
heating rate: 0.5° C./minute: 25° C.→150° C. holding time: 4 hours
heating rate: 0.5° C./minute: 150° C.→280° C. holding time: 4 hours
heating rate: 1° C./minute: 280° C.→600° C. holding time: 2 hours
cooling rate: 5° C./minute: 600° C.→25° C. end The obtained brown body was then sintered to full density under vacuum at a residual pressure of 0.001 mbar applying the following protocol, thereby obtaining a transparent glass article:
heating rate: 5° C./minute: 25° C.→1300° C. holding time: 2 hours
cooling rate: 5° C./minute: 1300° C.→25° C. end The obtained transparent glass article which is shown in FIG. 2, step (c), was made of fully dense fused silica glass. Specifically, the optical transmission thereof was more than 85% at a wavelength in the range from 300 nm to 400 nm for a layer thickness of 1.0 mm. As can be seen from the optical transmission spectra shown in FIG. 3, the optical transmission of the transparent glass article obtained by injection molding in Working Example 1 ("Injection molded glass") was comparable to the optical transmission of a commercially available transparent glass article made of fused silica ("Fused silica glass").

Working Example 2

Continuous Extrusion of a Nanocomposite Comprising Fused Silica Glass Particles 25 g fused silica glass particles with a mean average diameter of 50 nm to 100 nm were dispersed in a mixture of 6 g poly(vinyl butyral) and 6 g poly(ethylene glycol) (PEG 4000) using a double screw micro compounder to obtain a nanocomposite comprising the organic thermoplastic binder matrix and the silica glass particles dispersed therein.

The obtained nanocomposite was extruded using a capillary rheometer with an annular gap nozzle having an outer diameter of 16 mm and an inner diameter of 15 mm. The temperature was set to 130° C., and the nanocomposite comprising the molten organic thermoplastic binder matrix and the glass particles dispersed therein was continuously extruded using a piston speed of 1 mm/s. By extruding through the annular gap nozzle, a continuous tube-shaped green body was obtained.

The obtained green body having a tube shape was then immersed in water at 40° C. for 4 hours to remove poly (ethylene glycol) used as the phase-forming agent by means of solvent extraction.

The organic thermoplastic binder matrix of the immersed green body having a tube shape was then removed by thermal debinding applying the following protocol, thereby obtaining a continuous tube-shaped brown body:
heating rate: 0.5° C./minute: 25° C.→150° C. holding time: 4 hours
heating rate: 0.5° C./minute: 150° C.→280° C. holding time: 4 hours
heating rate: 1° C./minute: 280° C.→600° C. holding time: 2 hours
cooling rate: 5° C./minute: 600° C.→25° C. end The obtained brown body having a tube shape was then sintered to full density under vacuum at a residual pressure of 0.001 mbar applying the following protocol:
heating rate: 5° C./minute: 25° C.→1300° C. holding time: 2 hours
cooling rate: 5° C./minute: 1300° C.→25° C. end Thereby, a transparent fused silica glass tube was obtained.

Working Example 3

Preparation of Injection-Molded Binary-Doped Fused Silica Glasses

The green body obtained by injection molding in Working Example 1 was partially debound by immersing in water at 40° C. for 4 hours. The partially debound green body was then immersed for 24 hours in aqueous solutions of $Eu(NO_3)_3$ at a concentration of 25 mM and $Ce(NO_3)_3$ at a concentration of 10 mM, respectively. Subsequently, the partially debound and immersed green body was dried at 70° C.

The organic thermoplastic binder matrix of the immersed green body was then removed by thermal debinding applying the following protocol, thereby obtaining a brown body:
heating rate: 0.5° C./minute: 25° C.→150° C. holding time: 4 hours
heating rate: 0.5° C./minute: 150° C.→280° C. holding time: 4 hours
heating rate: 1° C./minute: 280° C.→600° C. holding time: 2 hours
cooling rate: 5° C./minute: 600° C.→25° C. end The obtained brown body was then sintered to full density under vacuum at a residual pressure of 0.001 mbar applying the following protocol:
heating rate: 5° C./minute: 25° C.→1300° C. holding time: 2 hours
cooling rate: 5° C./minute: 1300° C.→25° C. end Thereby, a transparent and colorless fused silica glass article was obtained, which showed fluorescence when illuminated with UV light at 254 nm ($Eu^{3+}$ giving rise to red fluorescence, and $Ce^{3+}$ giving rise to blue fluorescence).

Working Example 4

Effect of Phase-Forming Agent on the Preparation of Injection-Molded Fused Silica Glasses 21 g fused silica glass particles with a mean average diameter of 90 nm were dispersed in a solution of 2.06 g poly(ethylene glycol) (PEG 1500) and 8.01 g poly(vinyl butyral) in 72 g acetone using a laboratory dissolver. The mixture was then dried in an oven at 70° C. to obtain a nanocomposite with low phase-forming agent content (9 wt % of total feedstock).

21 g fused silica glass particles with a mean average diameter of 90 nm were dispersed in a solution of 5.15 g poly(ethylene glycol) (PEG 1500) and 5.02 g poly(vinyl butyral) in 45 g acetone using a laboratory dissolver. The mixture was then dried in an oven at 70° C. to obtain a nanocomposite with high enough phase-forming agent content (17 wt % of total feedstock).

The obtained nanocomposites with high and low phase-forming agent contents were injection-molded using a microinjection molder (DSM X-Plore) at a temperature of 130° C. and with a pressure of 8 bar for 4 seconds. The holding pressure was 8 bar. The mold of the microinjection molder was set to a temperature of 55° C. to keep the nanocomposite remoldable. By injection molding the nanocomposite, a green body having a predetermined shape was obtained.

The obtained green body was then immersed in water at 40° C. for 4 hours to remove poly(ethylene glycol) used as the phase-forming agent by means of solvent extraction.

Figure 4:
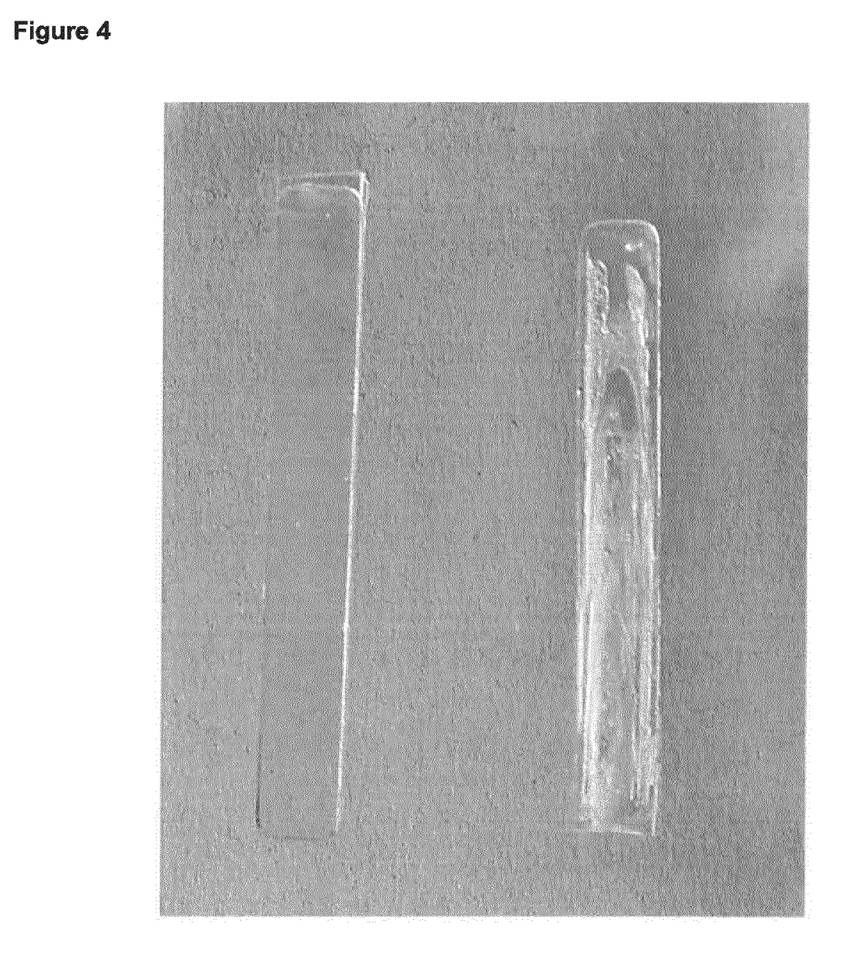
FIG. 4 shows a photograph of the glass articles obtained in Working Example 4 described below.

The organic thermoplastic binder matrix of the immersed green body was then removed by thermal debinding applying the following protocol, thereby obtaining a brown body:
heating rate: 0.5° C./minute: 25° C.→150° C. holding time: 4 hours
heating rate: 0.5° C./minute: 150° C.→280° C. holding time: 4 hours
heating rate: 1° C./minute: 280° C.→600° C. holding time: 2 hours
cooling rate: 5° C./minute: 600° C.→25° C. end The obtained brown body was then sintered under vacuum at a residual pressure of 0.001 mbar applying the following protocol, thereby obtaining a transparent glass article:
heating rate: 5° C./minute: 25° C.→1300° C. holding time: 2 hours
cooling rate: 5° C./minute: 1300° C.→25° C. end The obtained glass articles both having a thickness of 2.0 mm are shown in FIG. 4. As can be seen from FIG. 4, the glass article obtained with low amount of the phase-forming agent cracked during debinding, whereas the glass article obtained employing a higher amount of the phase-forming agent shows no cracks.

Comparative Examples 1 to 3

Variation of the Particle Diameter of the Glass Particles

In Comparative Examples 1 to 3, the following glass types were used to prepare nanocomposites.
Glass type 1—G018-354 (Schott) —$SiO_2$ (10-50 wt %), $Al_2O_3$ (1-10 wt %), Y203 (1-10 wt %), $B_2O_3$ (1-10 wt %), MgO (1-10 wt %), BaO (>50 wt %)—mean average diameter $d_{50}$=3 μm
Glass type 2—GM31107 (Schott) $SiO_2$ (1-10 wt %), $Al_2O_3$ (10.50 wt %), CaO (1-10 wt %), $B_2O_3$ (10-50 wt %), BaO (>50 wt %)—mean average diameter $d_{50}$=3 μm
Glass type 3—Duran 8330 (Schott) —$SiO_2$ (>50 wt %), $Al_2O_3$ (1-10 wt %), $K_2O$ (0.1-1 wt %), $B_2O_3$ (10-50 wt %), $Na_2O$ (1-10 wt %), NaCl (1-10 wt %)—mean average diameter $d_{50}$=700 nm A given amount of the respective glass type as shown in the following Table was dispersed in a thermoplastic binder consisting of poly(hydroxyethyl methacrylate) (obtained by radical polymerization via light from 15 ml of hydroxyethyl methylacrylate using 2.2-dimethoxy-2-phenylacetophenone as initiator) and phenoxyethanol (5 ml) using a laboratory dissolver. From this thermoplastic nanocomposite, green parts sheets with thicknesses ranging from 400 to 1000 μm were obtained.

| Glass type | Amount [g] |
| --- | --- |
| Type 1 | 92.1 |
| Type 2 | 90.7 |
| Type 3 | 44.6 |

Figure 5:
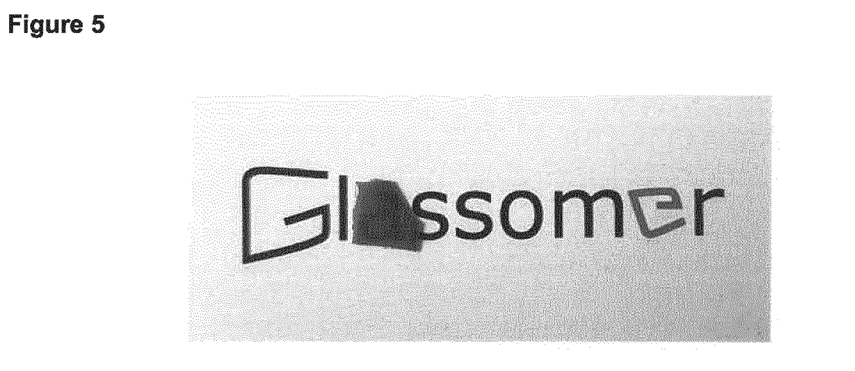
FIG. 5 shows a photograph of the glass article obtained in Comparative Example 1 described below.

The organic thermoplastic binder matrix of the green bodies was then removed by thermal debinding applying the following protocol, thereby obtaining a brown body (glass type 3) or a dense sintered glass part (glass type 1 and 2):
heating rate: 0.5° C./minute: 25° C.→150° C. holding time: 4 hours
heating rate: 0.5° C./minute: 150° C.→280° C. holding time: 4 hours
heating rate: 1° C./minute: 280° C.→600° C. holding time: 2 hours
cooling rate: 5° C./minute: 600° C.→25° C. end The obtained brown body of glass type 3 was then sintered under atmospheric pressure applying the following protocol, thereby obtaining a dense glass article:
Glass Type 3:
heating rate: 5° C./minute: 25° C.→800° C. holding time: 1 hours
cooling rate: 5° C./minute: 800° C.→25° C. end The obtained glass article of Comparative Example 1 using glass type 1 and having a thickness of 400 μm is shown in FIG. 5. As can be seen from FIG. 5, the glass article of Comparative Example 1 is not transparent.

Figure 6:
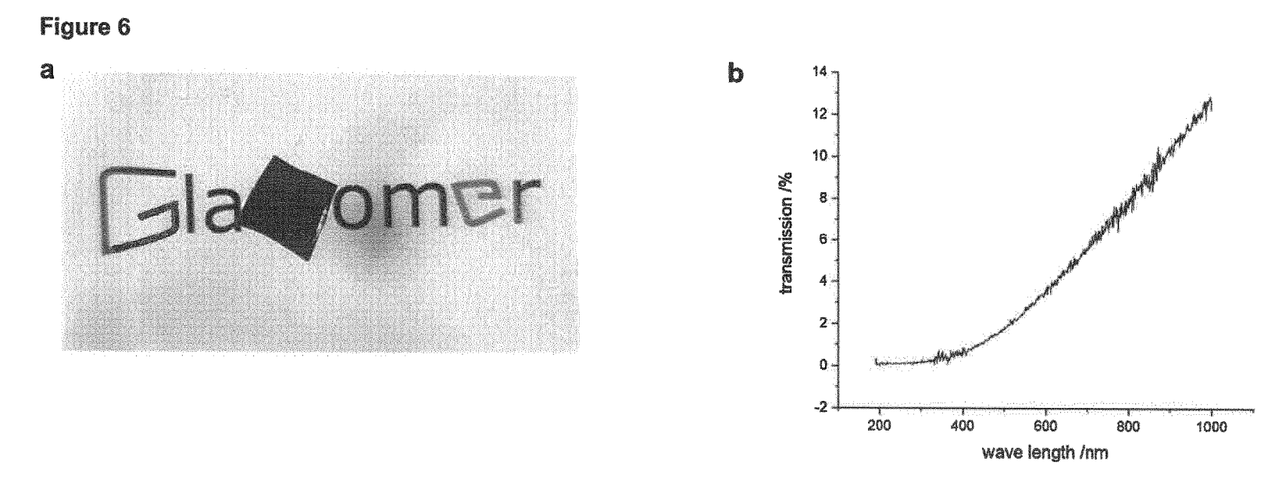
FIG. 6 shows (a) a photograph and (b) the optical transmission spectrum of the glass article obtained in Comparative Example 2 described below.

The obtained glass article of Comparative Example 2 using glass type 2 and having a thickness of 340 μm is shown in FIG. 6, step (a). As can be seen from FIG. 6, step (a), the obtained glass article of Comparative Example 2 is not transparent either. Specifically, as can be seen from the optical transmission spectrum shown in FIG. 6, step (b), the optical transmission of the glass article is below 15% at a wavelength in the range of 200 nm to 1000 nm.

Figure 7:
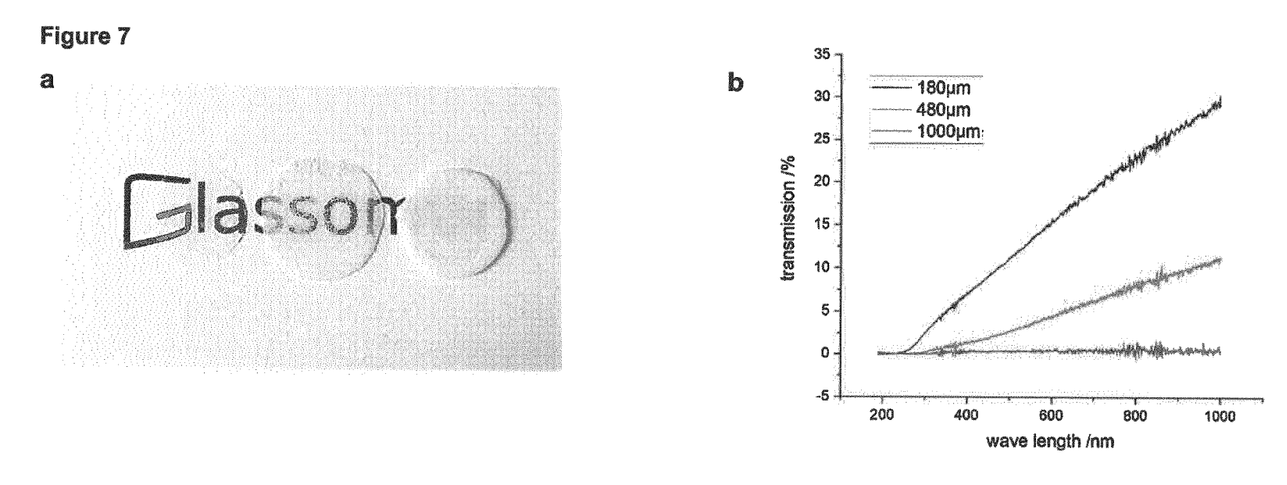
FIG. 7 shows (a) a photograph and (b) the optical transmission spectra of the glass articles obtained in Comparative Example 3 described below.

By using glass type 3 having a mean average diameter of 700 nm in Comparative Example 3, it is evident that also glass particles having said diameter do not result in transparent glass articles, even if the glass sheet has a thickness of 175 μm as shown in FIG. 7, step (a), on the left-hand side. Specifically, as can be seen from the optical transmission spectra shown in FIG. 7, step (b), the optical transmission of the glass article having a thickness of 175 μm is below 30% at a wavelength in the range of 200 nm to 1000 nm. For the glass article having a thickness of 480 μm, the optical transmission is at most about 10% at a wavelength in the range of 200 nm to 1000 nm, whereas the glass article having a thickness of 1.0 mm shows basically no transmission.

The invention claimed is:

1. A method of manufacturing a transparent glass article, the manufacturing method comprising the following steps (a) to (f):
   (a) providing a nanocomposite comprising an organic thermoplastic binder matrix and glass particles dispersed therein, the organic thermoplastic binder matrix being solid at room temperature; wherein the glass particles comprise spherical glass particles having a diameter ranging from 5 nm to 400 nm; wherein the nanocomposite further comprises at least one phase-forming agent dispersed in the organic thermoplastic binder matrix and does not include a solvent, and wherein the phase-forming agent is solid or viscous at room temperature and forms an internal phase in the organic thermoplastic binder matrix;
   (b) subjecting the nanocomposite to an external stimulus, thereby rendering the nanocomposite remoldable;
   (c) remolding the nanocomposite into a predetermined shape using a replication process, thereby obtaining a primary structure;
   (d) debinding the primary structure by removing the organic thermoplastic binder matrix, thereby obtaining a secondary structure, the secondary structure having cavities formed therein;

(e) optionally filling the cavities of the secondary structure with at least one additive; and (f) sintering the secondary structure, thereby obtaining the transparent glass article, wherein the thickness of the transparent glass article is 1.0 mm or more, and the optical transmission of the transparent glass article is more than 70% at a wavelength ranging from 200 nm to 1000 nm for a layer thickness of 1.0 mm, and the Vickers hardness of the transparent glass article is more than 700 HV as measured in accordance with DIN EN ISO 6507.

2. The manufacturing method according to claim 1, wherein the nanocomposite provided in step (a) is in granular form.

3. The manufacturing method according to claim 1, wherein the organic thermoplastic binder matrix is composed of polyesters based on aromatic or aliphatic dicarboxylic acids and dials and/or hydroxycarboxylic acids, polycarbonates based on aliphatic or aromatic dials, polyolefins such as polyethylene, polypropylene, polybutene, polymethylpentene, polyisobutene, ethylene propylene rubber (EPR), and poly(vinyl butyral), cycloolefin polymers, as well as polyamides, polyethers including aromatic polyethers based on bisphenols, or polyurethanes, or a combination thereof.

4. The manufacturing method according to claim 1, wherein the glass particles are fused silica glass particles.

5. The manufacturing method according to claim 1, wherein the spherical glass particles have a diameter ranging from 50 nm to 100 nm.

6. The manufacturing method according to claim 1, wherein the glass particles further comprise spherical glass particles having a diameter ranging from 2 μm to 40 μm.

7. The manufacturing method according claim 1, wherein the content of the glass particles in the nanocomposite is at least 30 parts per volume based on 100 parts per volume of the organic thermoplastic binder matrix.

8. The manufacturing method according to claim 1, wherein the at least one phase-forming agent is selected from the group consisting of polyethylene glycol (PEG).

9. The manufacturing method according to claim 1, wherein the nanocomposite is remolded into the predetermined shape in step (c) by means of injection molding, extrusion or blow molding.

10. The manufacturing method according to claim 1, wherein the primary structure obtained in step (c) is subjected to one of drilling, sawing, milling, lathing, grinding and polishing as a post-processing.

11. The manufacturing method according to claim 1, wherein the primary structure is debound in step (d) by means of thermal treatment, chemical reaction, reduced pressure, solvent extraction, or a combination thereof.

12. The manufacturing method according to claim 1, wherein the at least one additive is selected from pigments, doping reagents, and glass precursors.

13. The manufacturing method according to claim 1, wherein the cavities of the secondary structure are filled with the at least one additive in step (e) by immersing the secondary structure in a solution containing the at least one additive, by exposing the secondary structure to physical or chemical vapor deposition in an atmosphere containing or generating the at least one additive, or by a combination thereof.

* * * * *